(12) United States Patent
McPherson

(10) Patent No.: US 10,568,312 B2
(45) Date of Patent: Feb. 25, 2020

(54) FLOATING STORAGE BOX

(71) Applicant: Anthony McPherson, Cape Coral, FL (US)

(72) Inventor: Anthony McPherson, Cape Coral, FL (US)

(*) Notice: Subject to any disclaimer, the term of this patent is extended or adjusted under 35 U.S.C. 154(b) by 160 days.

(21) Appl. No.: 15/688,954

(22) Filed: Aug. 29, 2017

(65) Prior Publication Data

US 2019/0059347 A1   Feb. 28, 2019

(51) Int. Cl.
| | | |
|---|---|---|
| *A01K 97/06* | (2006.01) | |
| *A01K 97/10* | (2006.01) | |
| *B65D 25/28* | (2006.01) | |
| *B65D 43/16* | (2006.01) | |
| *B65D 81/32* | (2006.01) | |
| *B65D 81/38* | (2006.01) | |
| *B62B 1/10* | (2006.01) | |
| *B62B 1/20* | (2006.01) | |
| *B62B 1/26* | (2006.01) | |
| *B62B 3/00* | (2006.01) | |
| *B63B 22/24* | (2006.01) | |

(52) U.S. Cl.
CPC .............. *A01K 97/06* (2013.01); *A01K 97/10* (2013.01); *B62B 1/10* (2013.01); *B62B 1/20* (2013.01); *B62B 1/262* (2013.01); *B62B 3/004* (2013.01); *B65D 25/2885* (2013.01); *B65D 43/164* (2013.01); *B65D 81/3216* (2013.01); *B65D 81/38* (2013.01); *B62B 2202/402* (2013.01); *B63B 22/24* (2013.01)

(58) Field of Classification Search
CPC ........ A01K 97/06; A01K 97/10; B63B 22/24; B62B 1/262

USPC ................................. 220/560, 521, 592.03
See application file for complete search history.

(56) References Cited

U.S. PATENT DOCUMENTS

| | | | |
|---|---|---|---|
| 5,402,596 A | 4/1995 | Gillming, Jr. | |
| 5,864,981 A | 2/1999 | Zeman | |
| 5,975,334 A * | 11/1999 | Mayo ..................... | A45C 11/20 220/4.27 |
| 6,016,933 A * | 1/2000 | Daily ..................... | B63B 22/24 220/560 |
| 6,076,298 A | 6/2000 | Teel | |
| 6,405,478 B1 | 6/2002 | Westley | |
| 6,533,151 B1 * | 3/2003 | Link ..................... | A01K 97/06 206/315.11 |
| 6,658,786 B1 * | 12/2003 | Williams ............... | A01K 97/10 43/54.1 |
| 7,155,859 B1 | 1/2007 | Brooks | |
| 7,222,743 B1 * | 5/2007 | Wilhelm ................ | A01K 97/06 220/560 |
| D639,380 S | 6/2011 | Smith et al. | |
| 7,963,530 B1 * | 6/2011 | Garcia .................... | B62B 3/02 280/28 |
| 9,340,224 B2 * | 5/2016 | Yoder .................... | B62B 19/00 |
| 9,462,796 B1 | 10/2016 | Ellis et al. | |

(Continued)

*Primary Examiner* — Robert Poon

(57) ABSTRACT

A floating storage box includes a box that may contain objects. A first float is coupled around the box. The first float is comprised of a buoyant material to float the box when the box is placed in water. A pair of wheels is each rotatably coupled to the box to roll along a support surface. A pair of legs is coupled to the box to abut the support surface. A first lid is hingedly coupled to the box such that the first lid selectively closes the box. A second lid is hingedly coupled to the first lid.

10 Claims, 6 Drawing Sheets

(56) References Cited

U.S. PATENT DOCUMENTS

| | | |
|---|---|---|
| 2005/0055869 A1 | 3/2005 | Corso et al. |
| 2011/0197494 A1 | 8/2011 | Schumacher et al. |
| 2011/0239525 A1 | 10/2011 | Morales |
| 2016/0120347 A1* | 5/2016 | Ballard .............. A47G 23/0216 220/560 |
| 2017/0245486 A1* | 8/2017 | Larson ................... A01K 97/10 |

* cited by examiner

FLOATING STORAGE BOX

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to floating devices and more particularly pertains to a new floating device for selectively floating a storage box.

BRIEF SUMMARY OF THE INVENTION

An embodiment of the disclosure meets the needs presented above by generally comprising a box that may contain objects. A first float is coupled around the box. The first float is comprised of a buoyant material to float the box when the box is placed in water. A pair of wheels is each rotatably coupled to the box to roll along a support surface. A pair of legs is coupled to the box to abut the support surface. A first lid is hingedly coupled to the box such that the first lid selectively closes the box. A second lid is hingedly coupled to the first lid.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
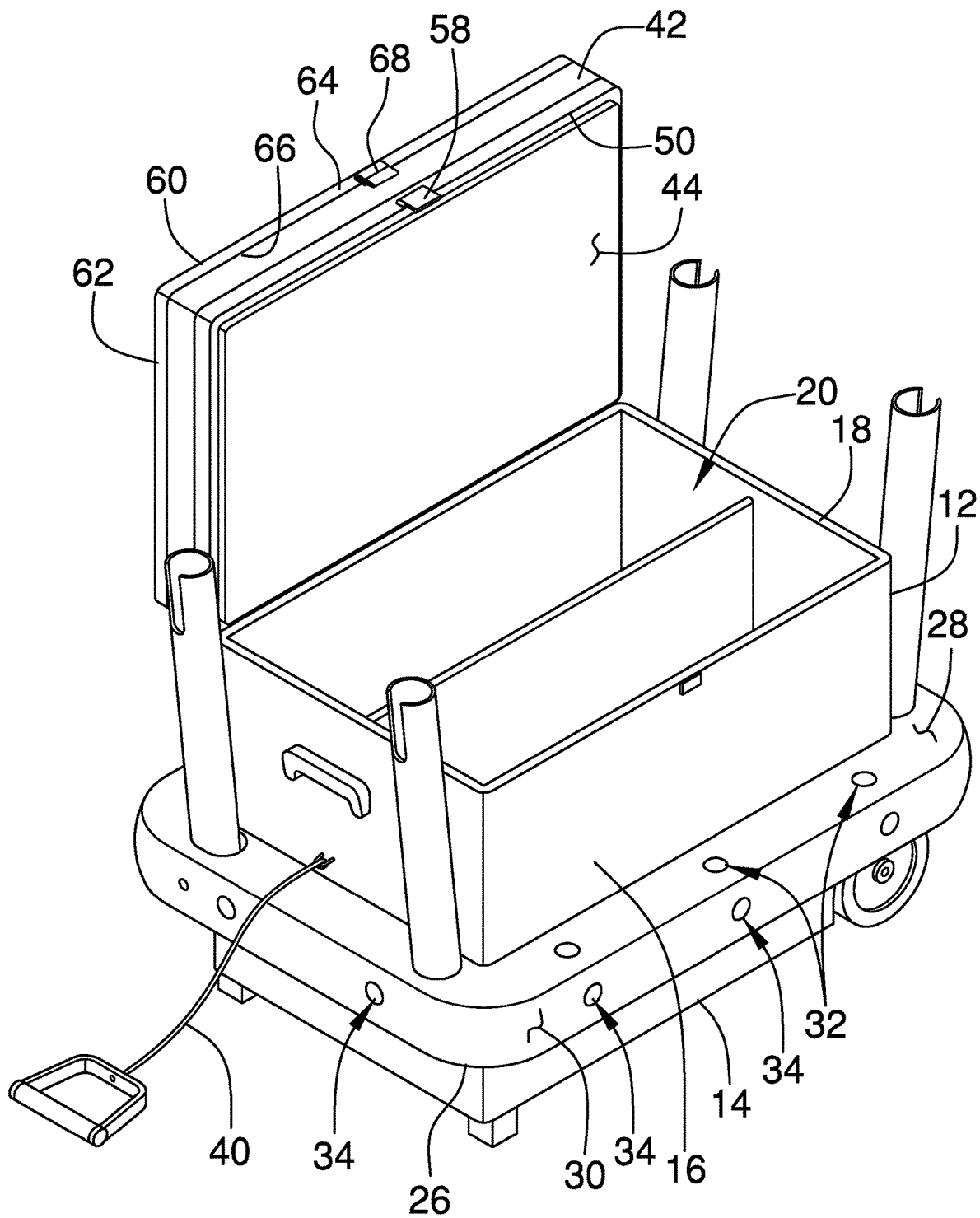
FIG. 1 is a perspective view of a floating storage box according to an embodiment of the disclosure.
Figure 2:
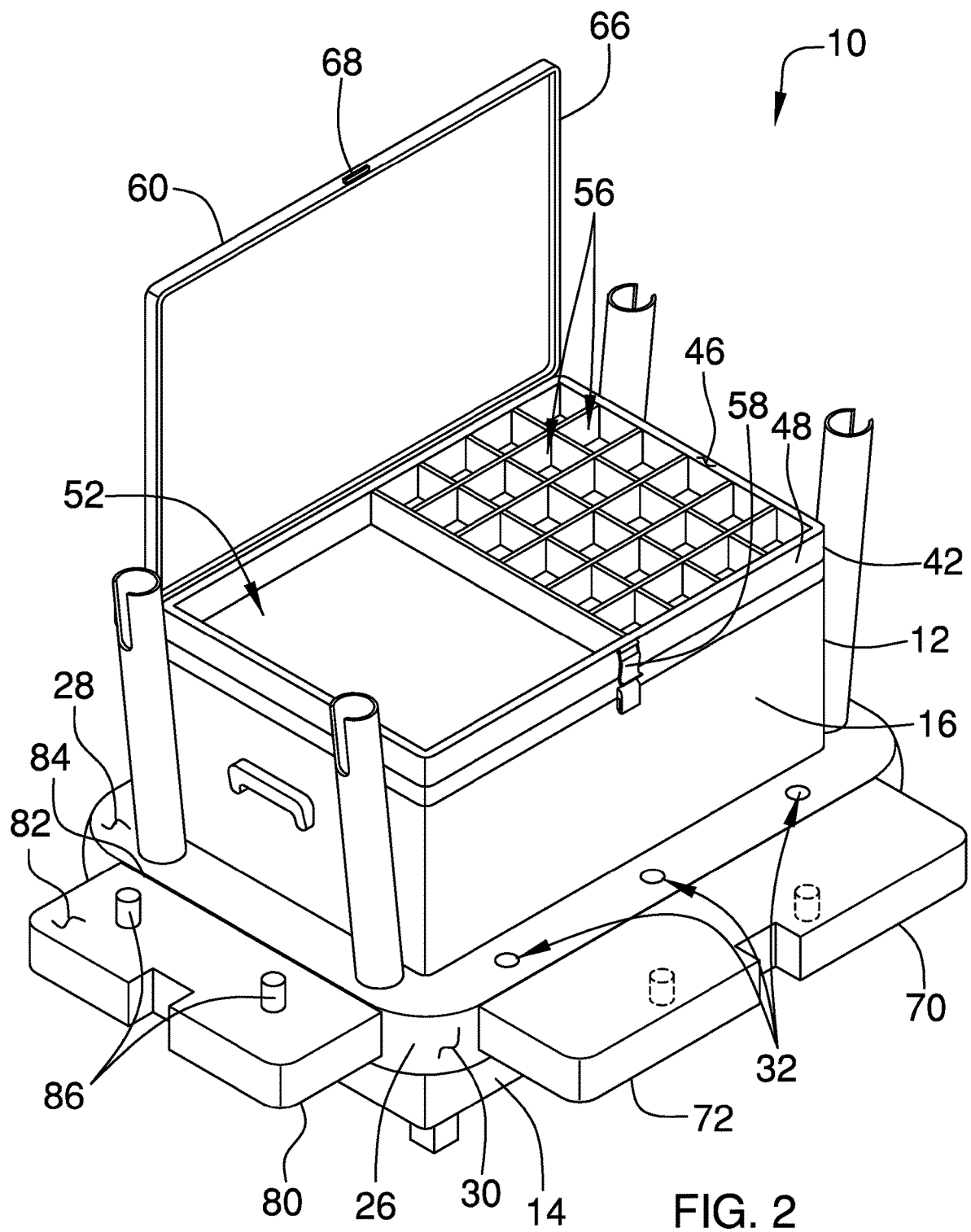
FIG. 2 is a top perspective view of an embodiment of the disclosure.
Figure 3:
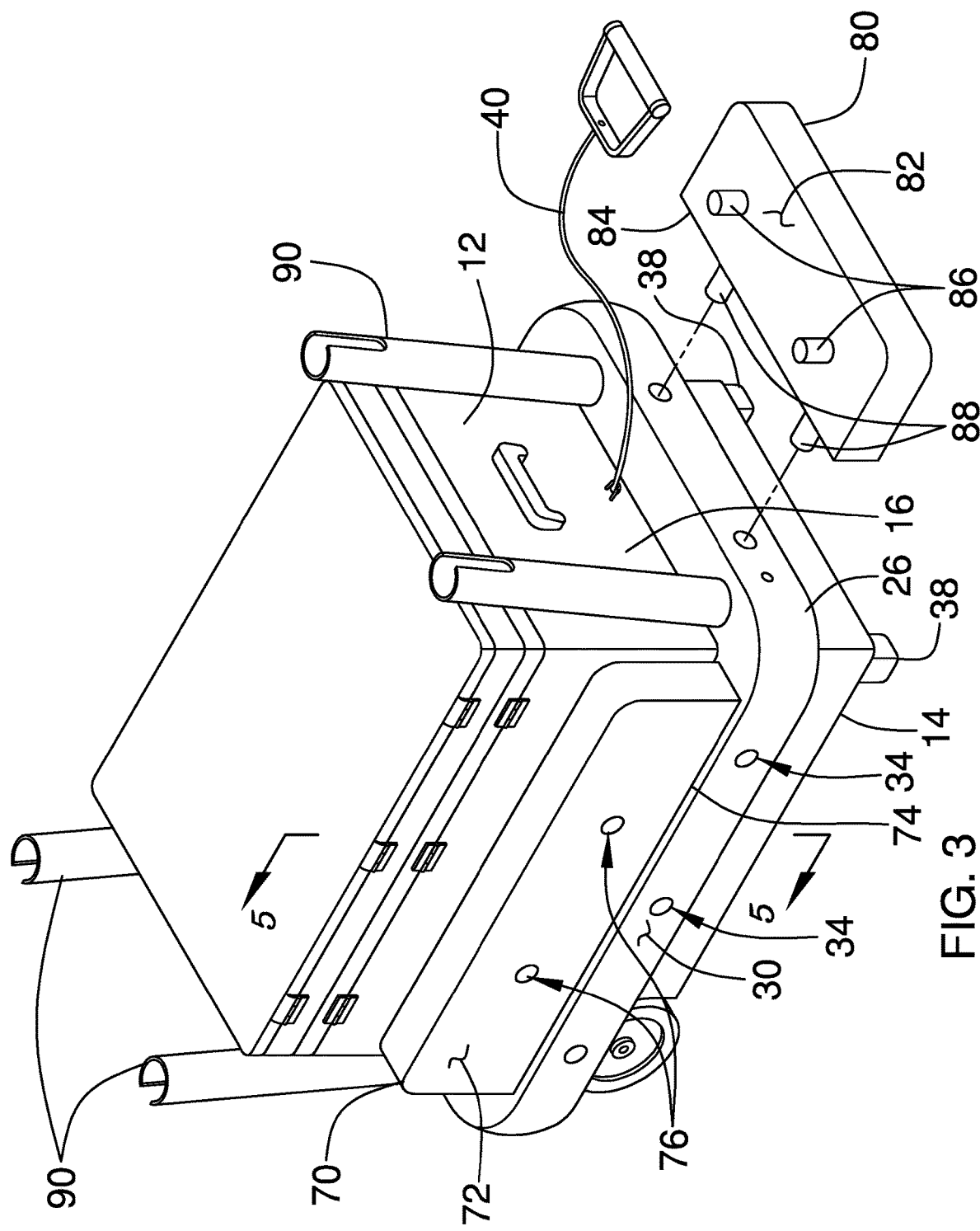
FIG. 3 is an exploded perspective view of an embodiment of the disclosure.
Figure 4:
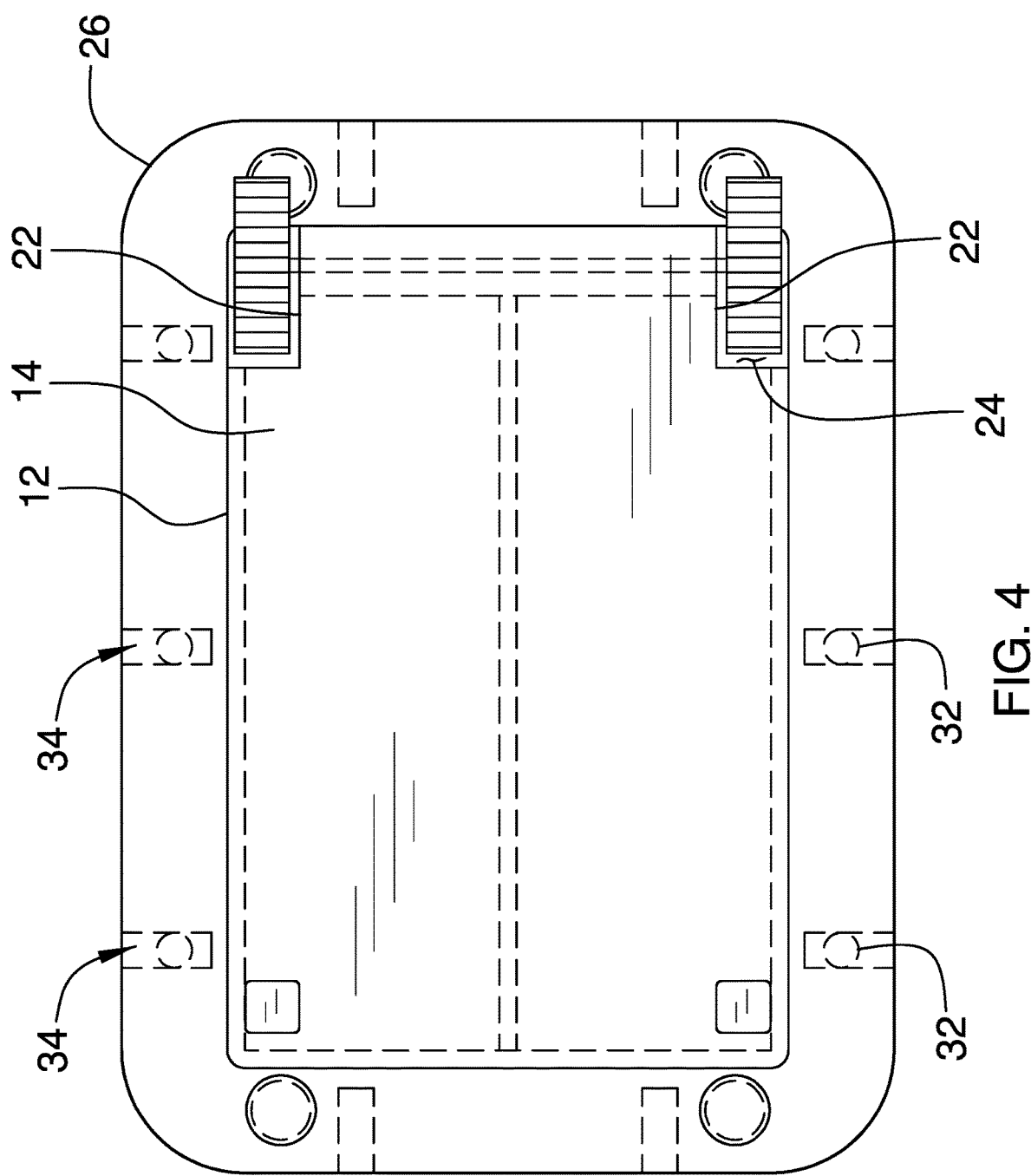
FIG. 4 is a bottom phantom view of an embodiment of the disclosure.
Figure 5:
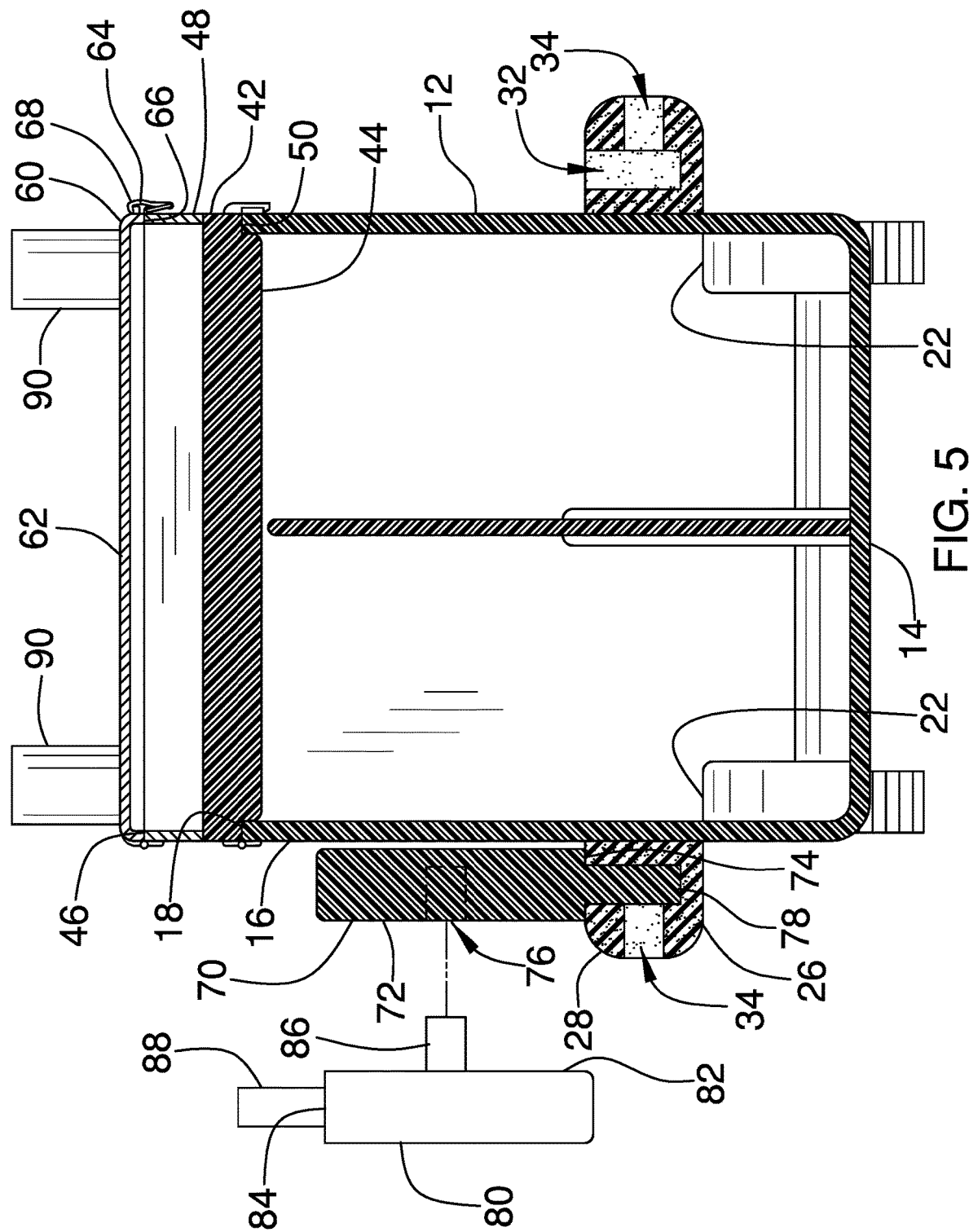
FIG. 5 is a cross sectional view taken along line 5-5 of FIG. 3 of an embodiment of the disclosure.
Figure 6:
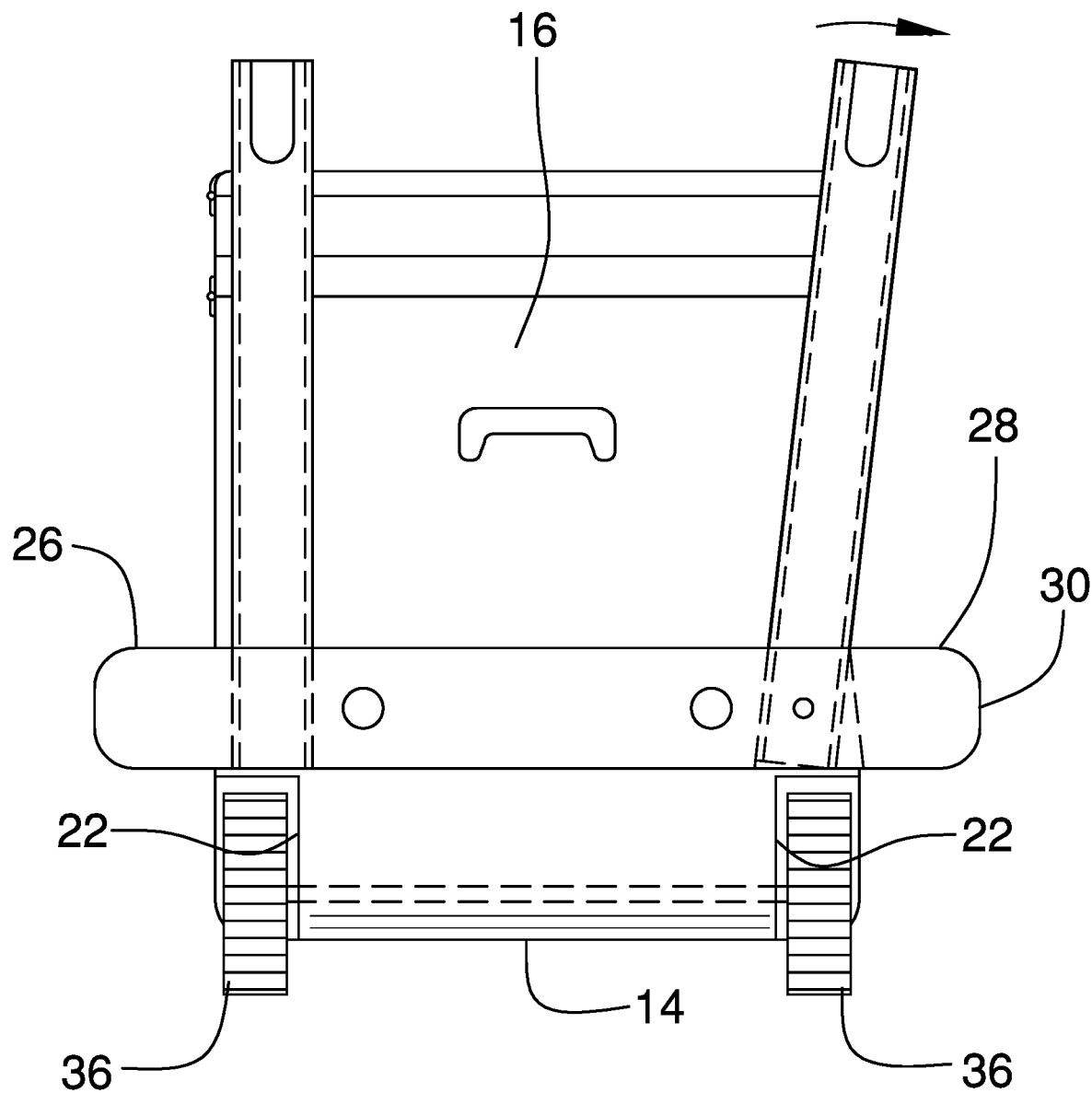
FIG. 6 is a front phantom view of an embodiment of the disclosure.

With reference now to the drawings, and in particular to FIGS. 1 through 6 thereof, a new floating device embodying the principles and concepts of an embodiment of the disclosure and generally designated by the reference numeral 10 will be described.

As best illustrated in FIGS. 1 through 6, the floating storage box 10 generally comprises a box 12 that may contain objects. The box 12 has a bottom wall 14 and an outer wall 16 extending upwardly therefrom. The outer wall 16 has a distal edge 18 with respect to the bottom wall 14 to define an opening 20 into the box 12. The box 12 is comprised of a thermally insulating material to retain the objects at a selected temperature. The box 12 may be filled with ice or the like to cool the objects in the box 12.

The outer wall 16 has a pair of depressions 22 and each of the depressions 22 is aligned with the bottom wall 14. Each of the depressions 22 is positioned on opposite sides of the outer wall 16 with respect to each other. Moreover, each of the depressions 22 has a bounding surface 24 and the bounding surface 24 is concavely arcuate. Each of the depressions 22 is positioned at an intersection between the bottom wall 14 and a back side of the box 12.

A first float 26 is provided and the first float 26 is coupled around the box 12. The first float 26 is comprised of a buoyant material to float the box 12 when the box 12 is placed in water. The first float 26 is continuous such that the first float 26 extends around an entire perimeter of the outer wall 16. Moreover, the first float 26 is positioned closer to the bottom wall 14 than the distal edge 18.

The first float 26 has an upwardly facing surface 28 and an outwardly facing surface 30. The upwardly facing surface 28 has a plurality of first wells 32 each extending downwardly therein. The first wells 32 are spaced apart from each other and are distributed around the first float 26. The outwardly facing surface 30 has a plurality of second wells 34 each extending toward the box 12. Additionally, the second wells 34 are spaced apart from each other and are distributed around the first float 26.

A pair of wheels 36 is provided and each of the wheels 36 is rotatably coupled to the box 12 to roll along a support surface. Each of the wheels 36 is positioned in an associated one of the depressions 22 in the box 12. A pair of legs 38 is each coupled to the box 12 and each of the legs 38 abuts the support surface. Each of the legs 38 is positioned on the bottom wall 14 of the box 12. A handle 40 is coupled to the outer wall 16 of the box 12 and the handle 40 is gripped to tow the box 12 along the support surface. The handle 40 may include a band that is coupled to a box 12 and a grip that is coupled to the band.

A first lid 42 is hingedly coupled to the box 12 such that the first lid 42 selectively closes the box 12. The first lid 42 has a first surface 44, a second surface 46 and a peripheral edge 48 extending therebetween. The peripheral edge 48 is hingedly coupled to the distal edge 18 of the box 12 and the first surface 44 has a groove 50 extending toward the second surface 46. The groove 50 is coextensive with the peripheral edge 48. The groove 50 receives the distal edge 18 of the box 12 when the first lid 42 is closed.

The second surface 46 has a third well 52 extending toward the first surface 44 to contain objects. A tackle box 54 is provided and the tackle box 54 is positioned in the third well 52. The tackle box 54 has a plurality of compartments 56 for containing fishing tackle. The tackle box 54 may be a plastic tackle box or the like. A first fastener 58 is coupled to the peripheral edge 48 of the first lid 42 and the first fastener 58 is selectively manipulated. The first fastener 58 removably engages the box 12 to retain the first lid 42 in a closed position. The first fastener 58 may be a mechanical latch or the like A second lid 60 is hingedly coupled to the first lid 42. The second lid 60 has a first wall 62 and a perimeter wall 64 extending downwardly therefrom. The perimeter wall 64 of the second lid 60 has a distal edge 66 with respect to the first wall 62. The distal edge 66 of the second lid 60 is hingedly coupled to the first surface 44 of the second lid 60. A second fastener 68 is coupled to the perimeter wall 64 of the second lid 60 and the second fastener 68 is selectively manipulated. The second fastener 68 removably engages the first lid 42 to retain the second lid 60 in a closed position. The second fastener 68 may be a mechanical latch or the like.

A second float 70 is provided that has a first surface 72 and a first lateral edge 74. The first surface 44 of the second float 70 has a plurality of fourth wells 76 extending downwardly therein. Moreover, the second float 70 is comprised of a buoyant material. A plurality of first pegs 78 is each coupled to and extends away from the first surface 44 of the second float 70. Each of the first pegs 78 engages selected ones of the first wells 32 in the first float 26 to store the second float 70. Additionally, each of the first pegs 78 engages selected ones of the second wells 34 in the first float 26 having the second float 70 extending laterally away from the first float 26. In this way the second float 70 increases buoyancy of the box 12 with respect to the first float 26.

A third float 80 is provided that has a first surface 82 and a first lateral edge 84. The third float 80 is comprised of a buoyant material. A plurality of second pegs 86 is each coupled to and extends away from the first surface 82 of the third float 80. Each of the second pegs 86 engages selected ones of the fourth wells 76 in the second float 70 to store the third float 80. A plurality of third pegs 88 is provided and each of the third pegs 88 is coupled to and extends away from the first lateral edge 84 of the third float 80. Each of the third pegs 88 engages selected ones of the second wells 34 in the first float 26 having the third float 80 extending laterally away from the first float 26. In this way the third float 80 increases buoyancy of the box 12 with respect to the first float 26.

A plurality of tubes 90 is provided and each of the tubes 90 has an outer wall 92. The outer wall 92 of each of the tubes 90 is pivotally coupled to the outer wall 16 of the box 12. Moreover, each of the tubes 90 is vertically oriented to store an elongated object such as a fishing pole or the like. Each of the tubes 90 may be a rod holder of any conventional design.

In use, the ice and objects are positioned in the box 12 for a trip to a remote location. The fishing tackle is placed in the tackle box 54 and fishing poles are positioned in the tubes 90. In this way every item needed to go fishing is carried in the box 12. Moreover, the box 12 is selectively floated in water when a user is wading in the water. Additionally, the box 12 may be towed behind a personal watercraft, such as a kayak or the like. Each of the second and third float 80 are coupled to the first float 26 to increase buoyancy of the box 12 and to increase stability of the box 12 when the box 12 is floating.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items the word are included, but items not specifically mentioned are not excluded. A reference to an element by the indefinite article "a" does not exclude the possibility that more than one of the element is present, unless the context clearly requires that there be only one of the elements.

I claim:

1. A floating storage box assembly being configured to be selectively floated in water, said assembly comprising:

a box being configured to contain objects, said box having a bottom wall and an outer wall extending upwardly therefrom, said outer wall having a distal edge with respect to said bottom wall to define an opening into said box, said box being comprised of a thermally insulating material, said outer wall having a pair of depressions, each of said depressions being aligned with said bottom wall, each of said depressions being positioned on opposite sides of said outer wall with respect to each other, each of said depressions having a bounding surface, said bounding surface being concavely arcuate;

a first float being coupled around said box, said first float being comprised of a buoyant material wherein said first float is configured to float said box when said box is placed in water, said first float being continuous such that said first float extends around an entire perimeter of said outer wall, said first float being positioned closer to said bottom wall than said distal edge, said first float having an upwardly facing surface and an outwardly facing surface, said upwardly facing surface having a plurality of first wells each extending downwardly therein, said first wells being spaced apart from each other and being distributed around said first float, said outwardly facing surface having a plurality of second wells each extending toward said box, said second wells being spaced apart from each other and being distributed around said first float;
a pair of wheels, each of said wheels being rotatably coupled to said box wherein each of said wheels is configured to roll along a support surface;
a pair of legs, each of said legs being coupled to said box wherein each of said legs is configured to abut the support surface;
a first lid being hingedly coupled to said box such that said first lid selectively closes said box;
a second lid being hingedly coupled to said first lid;
a second float having a first surface and a first lateral edge, said first surface having a plurality of fourth wells extending downwardly therein, said second float being comprised of a buoyant material; and
a plurality of first pegs, each of said first pegs being coupled to and extending away from said first surface of said second float, each of said first pegs engaging selected ones of said first wells in said first float to store said second float, each of said first pegs engaging selected ones of said second wells in said first float having said second float extending laterally away from said first float wherein said second float is configured to increase buoyancy of said box with respect to said first float.

2. The assembly according to claim 1, wherein:
said first lid has a first surface, a second surface and a peripheral edge extending therebetween, said peripheral edge being hingedly coupled to said distal edge of said box;
said first surface has a groove extending toward said second surface, said groove being coextensive with said peripheral edge, said groove receiving said distal edge of said box when said first lid is closed; and
said second surface has a third well extending toward said first surface wherein said third well is configured to contain objects.

3. The assembly according to claim 2, further comprising a first fastener being coupled to said peripheral edge of said first lid wherein said first fastener is configured to be manipulated, said first fastener removably engaging said box to retain said first lid in a closed position.

4. The assembly according to claim 2, wherein said second lid has a first wall and a perimeter wall extending downwardly therefrom, said perimeter wall of said second lid having a distal edge with respect to said first wall, said distal edge of said second lid being hingedly coupled to said first surface of said second lid.

5. The assembly according to claim 4, further comprising a second fastener being coupled to said perimeter wall of said second lid wherein said second fastener is configured to be manipulated, said second fastener removably engaging said first lid to retain said second lid in a closed position.

6. The assembly according to claim 1, further comprising a third float having a first surface and a first lateral edge.

7. The assembly according to claim 6, further comprising a plurality of second pegs, each of said second pegs being coupled to and extending away from said first surface of said third float, each of said second pegs engaging selected ones of said fourth wells in said second float to store said third float.

8. The assembly according to claim 7, further comprising a plurality of third pegs, each of said third pegs being coupled to and extending away from said first lateral edge of said third float, each of said third pegs engaging selected ones of said second wells in said first float having said third float extending laterally away from said first float wherein said third float is configured to increase buoyancy of said box with respect to said first float.

9. The assembly according to claim 1, further comprising a plurality of tubes, each of said tubes having an outer wall, said outer wall of each of said tubes being pivotally coupled to said outer wall of said box having each of said tubes being vertically oriented wherein each of said tubes is configured to store an elongated object.

10. A floating storage box assembly being configured to be selectively floated in water, said assembly comprising:
a box being configured to contain objects, said box having a bottom wall and an outer wall extending upwardly therefrom, said outer wall having a distal edge with respect to said bottom wall to define an opening into said box, said box being comprised of a thermally insulating material, said outer wall having a pair of depressions, each of said depressions being aligned with said bottom wall, each of said depressions being positioned on opposite sides of said outer wall with respect to each other, each of said depressions having a bounding surface, said bounding surface being concavely arcuate;
a first float being coupled around said box, said first float being comprised of a buoyant material wherein said first float is configured to float said box when said box is placed in water, said first float being continuous such that said first float extends around an entire perimeter of said outer wall, said first float being positioned closer to said bottom wall than said distal edge, said first float having an upwardly facing surface and an outwardly facing surface, said upwardly facing surface having a plurality of first wells each extending downwardly thereon, said first wells being spaced apart from each other and being distributed around said first float, said outwardly facing surface having a plurality of second wells each extending toward said box, said second wells being spaced apart from each other and being distributed around said first float;
a pair of wheels, each of said wheels being rotatably coupled to said box wherein each of said wheels is configured to roll along a support surface, each of said wheels being positioned in an associated one of said depressions in said box;
a pair of legs, each of said legs being coupled to said box wherein each of said legs is configured to abut the support surface, each of said legs being positioned on said bottom wall of said box;
a first lid being hingedly coupled to said box such that said first lid selectively closes said box, said first lid having a first surface, a second surface and a peripheral edge extending therebetween, said peripheral edge being hingedly coupled to said distal edge of said box, said first surface having a groove extending toward said second surface, said groove being coextensive with said peripheral edge, said groove receiving said distal edge of said box when said first lid is closed, said second surface having a third well extending toward said first surface wherein said third well is configured to contain objects;
a first fastener being coupled to said peripheral edge of said first lid wherein said first fastener is configured to be manipulated, said first fastener removably engaging said box to retain said first lid in a closed position;
a second lid being hingedly coupled to said first lid, said second lid having a first wall and a perimeter wall extending downwardly therefrom, said perimeter wall of said second lid having a distal edge with respect to said first wall, said distal edge of said second lid being hingedly coupled to said first surface of said second lid;

a second fastener being coupled to said perimeter wall of said second lid wherein said second fastener is configured to be manipulated, said second fastener removably engaging said first lid to retain said second lid in a closed position;

a second float having a first surface and a first lateral edge, said first surface of said second float having a plurality of fourth wells extending downwardly therein, said second float being comprised of a buoyant material;

a plurality of first pegs, each of said first pegs being coupled to and extending away from said first surface of said second float, each of said first pegs engaging selected ones of said first wells in said first float to store said second float, each of said first pegs engaging selected ones of said second wells in said first float having said second float extending laterally away from said first float wherein said second float is configured to increase buoyancy of said box with respect to said first float;

a third float having a first surface and a first lateral edge;

a plurality of second pegs, each of said second pegs being coupled to and extending away from said first surface of said third float, each of said second pegs engaging selected ones of said fourth wells in said second float to store said third float;

a plurality of third pegs, each of said third pegs being coupled to and extending away from said first lateral edge of said third float, each of said third pegs engaging selected ones of said second wells in said first float having said third float extending laterally away from said first float wherein said third float is configured to increase buoyancy of said box with respect to said first float; and a plurality of tubes, each of said tubes having an outer wall, said outer wall of each of said tubes being pivotally coupled to said outer wall of said box having each of said tubes being vertically oriented wherein each of said tubes is configured to store an elongated object.

\* \* \* \* \*